United States Patent [19]
Takemura et al.

[11] Patent Number: 5,880,545
[45] Date of Patent: Mar. 9, 1999

[54] SPINDLE MOTOR WITH BEARING SYSTEM HAVING FLUID SEALING AND LEAKAGE PREVENTION

[75] Inventors: Yoshihiro Takemura; Osamu Wada, both of Komagane; Kazuto Miyajima, Ina; Norikazu Oguchi; Shohei Fukunaga, both of Komagane, all of Japan

[73] Assignee: Nidec Corporation, Kyoto, Japan

[21] Appl. No.: 947,074

[22] Filed: Oct. 8, 1997

Related U.S. Application Data

[62] Division of Ser. No. 618,973, Mar. 20, 1996, abandoned.

[30] Foreign Application Priority Data

Mar. 22, 1995 [JP] Japan ..................... 7-90384
Mar. 31, 1995 [JP] Japan ..................... 7-97740
Mar. 31, 1995 [JP] Japan ..................... 7-99739

[51] Int. Cl.$^6$ ............. H02K 7/08; F16C 17/10; G11B 17/02
[52] U.S. Cl. .............. 310/90; 310/67 R; 384/100; 384/112; 384/114; 384/107; 360/98.07; 360/99.04; 360/99.08; 277/53; 277/57
[58] Field of Search .................. 310/90, 67 R; 384/100, 107, 112, 114, 121, 123, 124, 132; 277/53–57; 360/99.08, 99.04, 98.07

[56] References Cited

U.S. PATENT DOCUMENTS

| | | | |
|---|---|---|---|
| 4,458,957 | 7/1984 | Greener | 308/187.1 |
| 4,922,406 | 5/1990 | Schuh | 360/97.03 |
| 4,996,613 | 2/1991 | Hishida | 360/99.08 |
| 5,347,189 | 9/1994 | Chuta et al. | 310/90 |
| 5,503,407 | 4/1996 | McNickle | 277/134 |
| 5,596,235 | 1/1997 | Yazaki et al. | 310/67 R |
| 5,663,602 | 9/1997 | Shimizu et al. | 310/67 R |
| 5,770,906 | 6/1998 | Hazelton et al. | 310/90 |

FOREIGN PATENT DOCUMENTS 4-295245 10/1992 Japan.

Primary Examiner—Thomas M. Dougherty
Assistant Examiner—Tran N. Nguyen
Attorney, Agent, or Firm—McCormick, Paulding & Huber

[57] ABSTRACT

The invention is a spindle motor including a rotor hub bearing a rotational load, lubricant-containing bearing systems rotatably supported by the rotor hub, and stator windings wound on a stationary member, so as to oppose the rotor magnet. At least a portion of the rotor hub is in a clean environment, with the motor substantially sealed by a sealing unit. The spindle motor has a leakage prevention unit which prevents the lubricant trying to leak out the bearing systems and out the motor, when centrifugal forces produced by a rotor hub rotating at a high speed are exerted on the lubricant.

38 Claims, 15 Drawing Sheets

5,880,545

SPINDLE MOTOR WITH BEARING SYSTEM HAVING FLUID SEALING AND LEAKAGE PREVENTION

This is a divisional of application Ser. No. 08/618,973 filed on Mar. 20, 1996, now abandoned.

FIELD OF THE INVENTION

The present invention relates to a spindle motor for use in a storage disk of a magneto-optic disk drive, a mirror of a laser beam printer, etc., in order to rotatingly drive the storage disk or mirror.

DESCRIPTION OF THE RELATED ART

For example, a spindle motor used in a magneto-optic disk driver is disclosed in Japanese Patent Laid-Open No. 4-29524. The spindle motor has a ferro-fluid sealing device or a labyrinth structure for sealing the inner and outer portions of the motor, so that the unclean air in the motor does not leak out to the disk mounting space where the air is kept clean at the outer side of the motor.

In recent years, such a disk driver is becoming smaller, and higher in performance and capacity. This has caused an increasing demand for smaller and thinner spindle motor which can rotate at a high speed. For example, magnetic disks conventionally rotating at about 5,400 rpm are now rotating at ranges exceeding 7,200 rpm.

As the revolution speed of the spindle motor increases, the lubricant in the ball bearings, fluid dynamic bearings, etc., rotatably supporting the rotor hub, try to leak out the motor due to the action of centrifugal forces. Therefore, the above-described sealing means cannot prevent the lubricant from leaking out the motor, thus staining the rotor hub or the like. More specifically, the lubricant leaks out from the slight gap at a junction of the component parts of the motor. In the labyrinth structure, the lubricant leaks along the surface of the sealing member, itself, and out the motor.

SUMMARY OF THE INVENTION

Accordingly, an object of the present invention is to provide a highly reliable spindle motor in which the lubricant of the bearing means in the motor does not leak out the motor and thus staining the rotational load, even when the motor rotates at a high speed.

Another object of the present invention is to provide a spindle motor smaller in size and higher in productivity in which the lubricant leakage can be prevented by a simple structure which does not take up space.

The present invention provides a spindle motor comprising:
 a rotor hub carrying a rotational load;
 lubricant-containing bearing systems, which are rotatably supported by the rotor hub;
 a rotor magnet disposed at the rotor hub;
 a stator winding wound on a stationary member so as to oppose the rotor magnet;
 the rotor hub having at least a portion thereof placed in a clean chamber;
 sealing means being provided adjacent to at least one of the bearing systems at the outer side of the motor as viewed in the axial direction of rotation in order to substantially protect the clean chamber from the unclean air and contaminations from the motor interior;
 wherein a leakage prevention means is provided along a section of a continuous surface extending from the bearing system to the rotor hub in order to prevent lubricant leakage from the bearing systems.

Even when the lubricant in the bearing systems tries to leak out the motor due to centrifugal forces produced by the motor rotating at a high speed, the lubricant leakage prevention means provided at a member present along the surface extending from the bearing system to the rotor hub prevents the leakage. This prevents the lubricant from staining the rotor hub, thus realizing a highly reliable spindle motor. Leakage prevention means that are used include those which collect the lubricant such as a ring-shaped groove, an absorbing member, etc. These lubricant prevention means have a simple structure and do not take up much space, resulting in a smaller motor and a spindle motor high in productivity.

DESCRIPTION OF THE PREFERRED EMBODIMENTS

A description will now be hereunder given of the preferred embodiments of the spindle motor in accordance with the present invention.

First Embodiment

Figure 1:
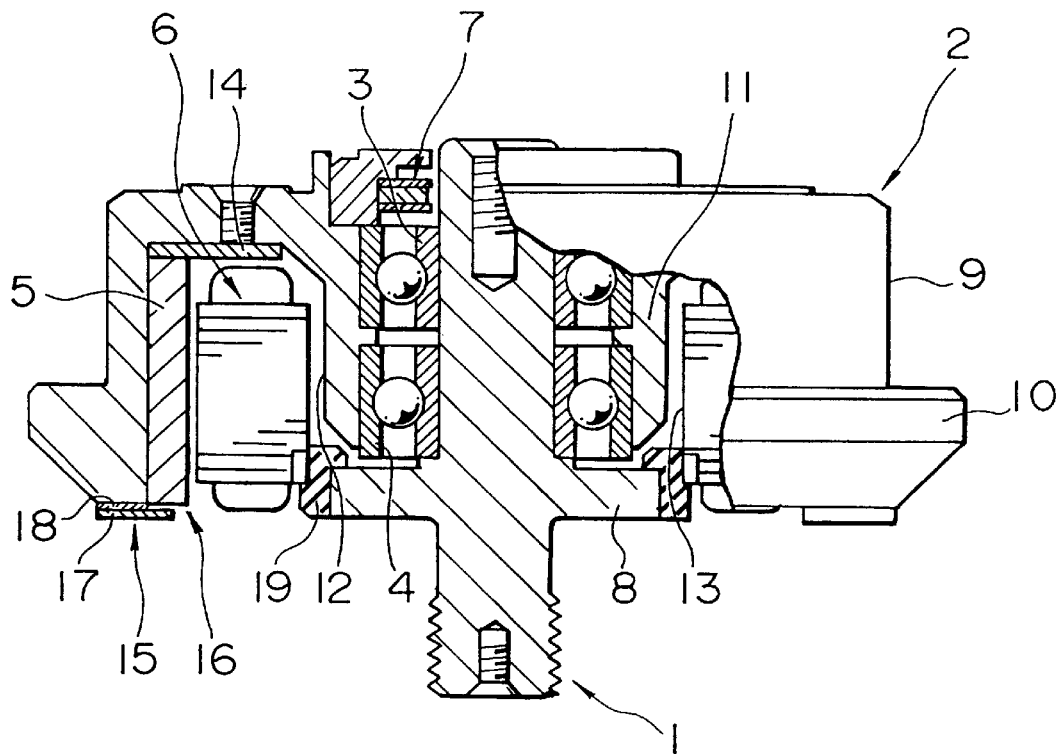
FIG. 1 is a cross sectional view of an entire spindle motor of a first embodiment of the present invention.

FIG. 1 is a cross sectional view of the entire spindle motor of a first embodiment of the present invention, which is utilized, for example, in a magnetic disk drive. Referring to the figure, tapped holes are provided in the upper and lower ends, respectively, of a shaft 1 being a stationary member. The upper and lower bases of the disk drive (not shown) are screwed into and fixedly supported at both ends of the shaft 1. An extending section 8 extending out radially and substantially from about the central portion of the shaft 1 is formed integral with the shaft 1 and is secured to a stator 6 via a holding member 19. A pair of ball bearings 3, 4 are provided at the upper side of the shaft 1.

For example, three disks (not shown) are fitted to an outer peripheral portion 9 (having the maximum outer diameter) of a rotor hub 2 which is rotatably supported by the ball bearings 3, 4. These disks come to rest on a flange 10 which extends radially at the lower portion of the rotor hub 2. A cylindrical section 11 is coaxially and integrally in the rotor hub 2, within which cylindrical portion 11 the ball bearings 3, 4 are mounted. In addition, a ring-shaped rotor magnet is disposed in the rotor hub and radially opposite to a stator 6. A required signal input to the stator 6 rotatingly drives the rotor hub 2 as a result of mutual electromagnetic interaction between the stator 6 and a rotor magnet 5.

A ferro-fluid sealing device 7 is provided above the ball bearing 3, and a labyrinth structure is formed below the ball bearing 4. In the labyrinth structure, the outer periphery 12 of the cylindrical section 11 and the inner periphery of the stator 6 are disposed close to each other. Both sealing means retains the inner and outer portions of the motor. A sealing member 14 is affixed in the rotor hub 2, which seals up a tapped hole to secure the disks.

Accordingly, when a spindle motor is incorporated in a disk drive, the rotor hub 2 and the disks mounted thereto are accommodated in a clean chamber in the disk drive. This is made possible by the aforementioned sealing means of the motor, which prevent the unclean air and contamination in the motor from leaking out to the clean chamber, so that the clean chamber in the disk driver is kept free from cantamination.

In the spindle motor of the present embodiment, a lubricant leakage prevention section 15 is provided at the lower end of the flange 10 of the rotor hub 2, in addition to the aforementioned sealing means. The lubricant leakage prevention section 15 is affixed to the lower end of the flange 10. In the section 15, the ring-shaped plate 17 is affixed to the flange 10 by a spacer 18 which is adhesive. In addition, a ring-shaped groove 16 is formed in the leakage prevention section 15, which has an opening facing radially inward toward the axial center of the motor. The leakage prevention section 15 is provided to prevent leakage of the lubricant in the ball bearings toward the surface at the disk-mounting side of the rotor hub 2 or toward the flange 10.

More specifically, in the figure, in general, centrifugal force acts on the lubricant such as grease which is contained in the ball bearing 4 as the rotor hub 2 rotates at a high speed. Therefore, the lubricant tries to leak out from the surface of the outer periphery 12 of the cylindrical section 11 toward the outer periphery of the rotor hub 2 via the inner peripheral surface of the rotor magnet 5 forming a continuation with the outer periphery 12 surface. In other words, the centrifugal force exerted on the lubricant, being retained by surface tension, causes the lubricant to leak out progressively along a continuous surface path starting from the ball bearing 4 in the motor and leading to the outer side of the motor. The lubricant is, however, collected in the opening 16 or the ring-shaped groove 16 extending radially inward in the leakage prevention section 15 disposed at the lower end of the flange 10, thus preventing leakage toward the surface of the flange 10.

Usable materials for the plate 17 composing the leakage prevention 15 is not limited. It is possible to use various light plastic plates which allow the rotor hub 2 to rotate in a well balanced manner and facilitate assembly. Double-sided adhesives tapes may be used for the adhesive spacer 18.

Second Embodiment

The above-described spindle motor is the so-called shaft fixing type in which the rotor hub 2 is rotatably supported by the stationary shaft 1 via the ball bearings 3, 4. The spindle motor of the present embodiment is a shaft rotating type and is described with reference to FIG. 2. More specifically, in the present embodiment, a cylindrical section 31 secured at the driver (not shown) side is formed as the stationary member. A pair of ball bearings 23, 24 are provided within the cylindrical section 31, with a shaft 21 inserted and rotatably supported midway therebetween.

A rotor hub 22 is coaxially formed integral with the shaft 21. Disks (not shown) are retained by a flange 20 of the rotor hub 22. In the figure, one disk is mounted to the flange 20 of the rotor hub 22. A stator 26 is disposed at the outer periphery of the cylindrical section 31. A rotor yoke 29 and a rotor magnet 25 are provided at the inner side of the rotor hub 22 and radially opposite to the stator 26.

A sealing cap 33 is provided at the lower end of the cylindrical section 31 for sealing, in particular, the side where the ball bearing 24 is located. The ball bearing 23 and a step section 27 of the rotor hub 22 are provided adjacent to each other and above the ball bearing 23 (in the figure), that is at the outer side of the motor. They form a labyrinth seal structure at the side the ball bearing 23. Both of the aforementioned sealing means are used to seal the motor. In the present spindle motor, a leakage prevention section 35 is provided at the lower end of the flange 20 to prevent lubricant leakage from the ball bearing 23 to the flange 20 of the rotor hub 22.

Figure 2:
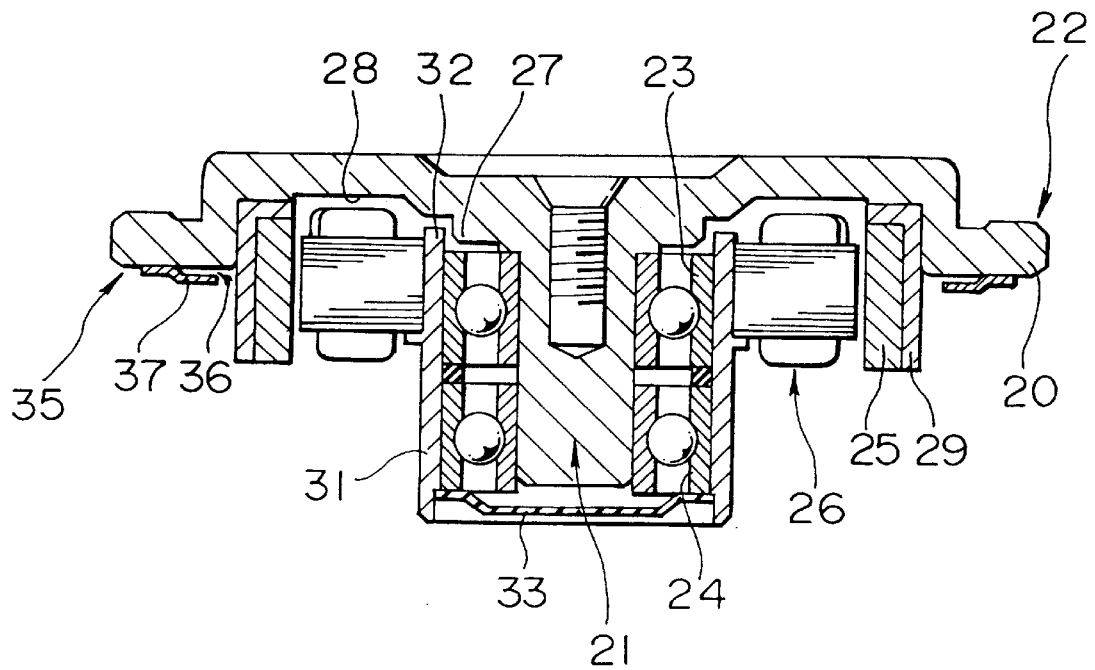
FIG. 2 is a cross sectional view of an entire spindle motor of a second embodiment of the present invention.

The leakage prevention section 35 is a thin steel sheet 37, being bent as illustrated in the figure. It is formed along the rotor hub 22 as a ring-shaped component part. A ring-shaped groove 36 is provided, with an opening which faces the center axis or radially inward of the motor. As in the embodiment of FIG. 1, it is provided to prevent the lubricant leakage from the ball bearings toward the flange 20 of the rotor hub 22. Referring to FIG. 2, in general, when the spindle motor rotates at a high speed, the lubricant tries to leak out primarily from the ball bearing 23, to the surfaces of the inner wall 28 of the rotor hub 22, the rotor magnet 25, and the rotor yoke 29, and to the surface of the flange 20. This is prevented by allowing the lubricant, being a fluid, to be collected in the leakage prevention section 35, provided at the lower end of the flange 20, that is in the ring-shaped groove 36. The method of affixing the steel sheet 37 to the rotor hub 22 can be arbitrarily selected depending on the material of the component part. They may be secured together by bonding, caulking, spot welding, solvent welding, etc.

Figure 3:
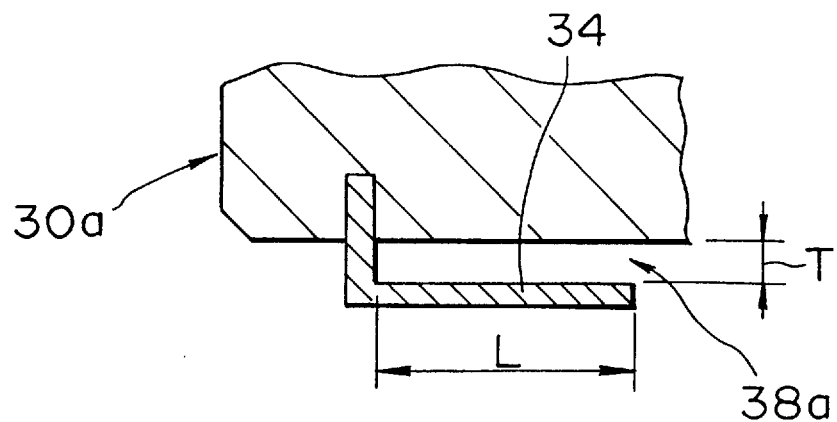
FIG. 3 is a partial cross sectional view of a spindle motor of a third embodiment of the present invention.
Figure 4:
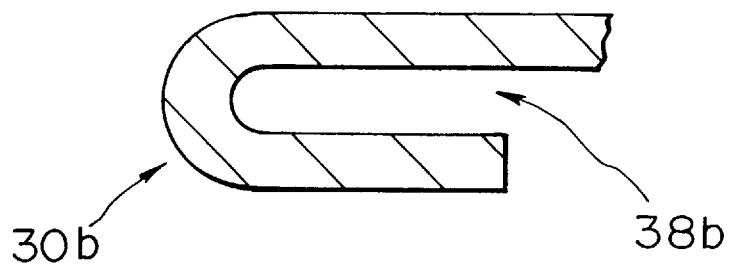
FIG. 4 is a partial cross sectional view of a spindle motor of a fourth embodiment of the present invention.
Figure 5:
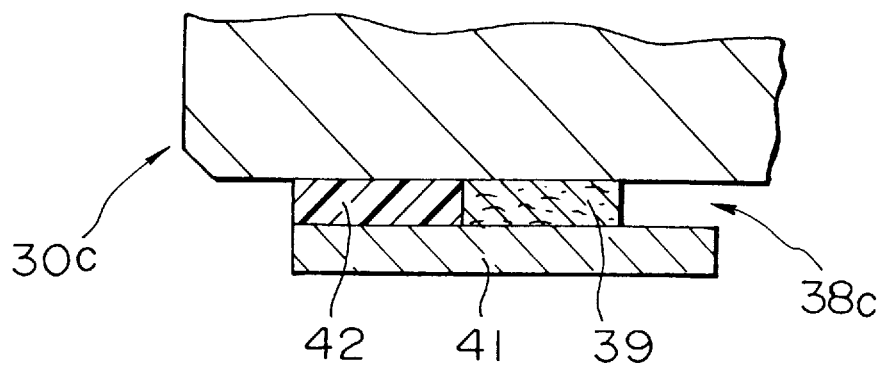
FIG. 5 is a partial cross sectional view of a spindle motor of a fifth embodiment of the present invention.

FIGS. 3 to 5 each illustrate different embodiments of the spindle motor of the present invention. They are each partial enlarged views of a modification of the leakage prevention sections 15, 35 of FIGS. 1 and 2, respectively, wherein each leakage prevention sections is affixed to the lower end of the flanges 30a to 30c of the rotor hub. It is possible to use any of these constructions of FIGS. 3 to 5 in the spindle motor of FIGS. 1 and 2.

Third Embodiment

Referring to FIG. 3, the lubricant leakage prevention section of the spindle motor is formed as a ring-shaped groove formed by a plate 34 bent into an L-shaped cross sectional form and having an opening which faces the center axis (or radially inward) of the motor. The plate 34 may be affixed to the rotor hub by welding, press-fitting, or some other method, depending on the material of the plate 34 to be affixed. In addition, it may be affixed to the rotor hub in various directions. The amount of lubricant the groove 38 can collect is determined by the radial length L and the axial length T.

The length of the groove 38a is set in accordance with, for example, the expected amount of lubricant leakage, which is also true for the embodiments described with reference with FIGS. 1 and 2 and the embodiments to be described with reference to FIGS. 4 and 5. In the present embodiment, the amount of grease the ball bearings can hold is very small at a few microliters, so that the radial length L and the axial length T are set at a few millimeters. It is, in particular, necessary to take into account the thickness of the material of the plate when setting the axial length. The radial length L can be set such that the groove is large enough to collect the lubricant of the ball bearings. The axial length can be less than 1 mm. In the present embodiment, the axial length is approximately 1 mm, and the radial length is approximately 5 mm.

Fourth Embodiment

FIG. 4 illustrates an embodiment in which the flange 30b of the rotor hub forms the boundary of the ring-shaped groove 38b as a result of elastically deforming a steel sheet. As in the other embodiments, the ring-shaped groove 38b collects the lubricant trying to leak out from the ball bearings toward the center axis of the motor, when centrifugal forces act on the lubricant and cause it to leak.

Fifth Embodiment

Referring to FIG. 5, a plate 41 is affixed to the lower end of the flange 30c via an adhesive spacer 42, resulting in the formation of the ring-shaped groove 38c. An absorbing member 39 is formed in the groove 38c for absorbing the lubricant. A resinous porous member, for example, may be used for the absorbing member 39 that holds the lubricant, being a fluid, collected in the ring-shaped groove 38c. It is, in particular, effective to use such an absorbing member when there is a large amount of lubricant to be held.

In the foregoing constructions illustrated in FIGS. 1 to 5, the rotor hubs 2, 22 of the spindle motor has an opening at one side (lower side in the figures) so that a lubricant leakage prevention section can be formed at the lower end of each of the flanges 10, 20, and 30 of the rotor hubs 2, 22. In the following embodiments, the spindle motor has a rotor hub supported by a bearing at both ends and having no opening.

Sixth Embodiment

Figure 6:
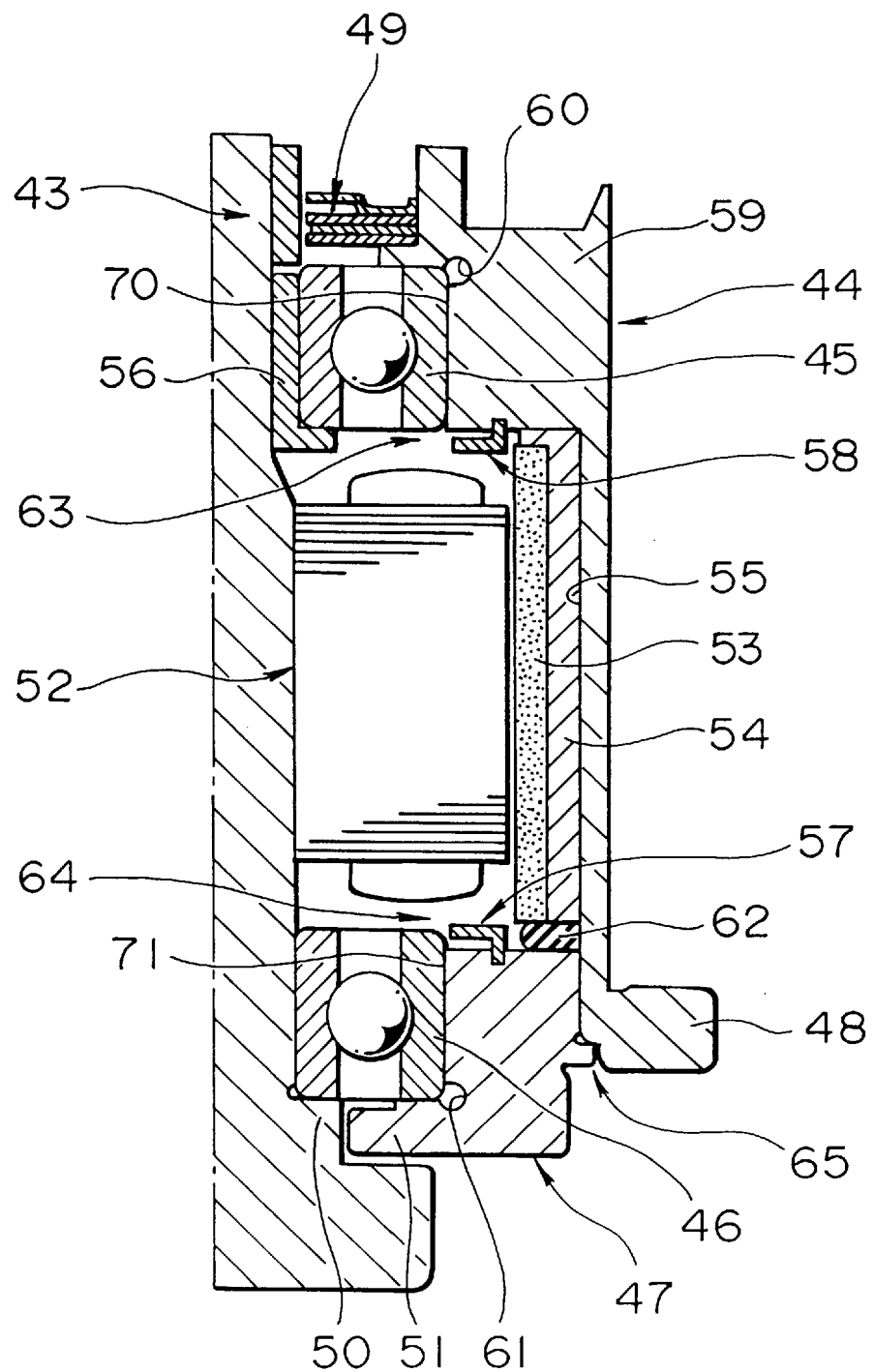
FIG. 6 is a semi-cross sectional view of a spindle motor of a sixth embodiment of the present invention.

FIG. 6 is a cross sectional view of the right half of a spindle motor with, for example, 10 recording disks mounted thereto. Referring to FIG. 6, the upper and lower ends of a shaft 43 are secured at the device side, and a rotor hub 44 is rotatably supported via a pair of ball bearings 45, 46 provided at the upper and lower portions of the shaft 43. More specifically, the upper inner peripheral portion of the hanging bell-like rotor hub 44 is mounted directly to the outer ring portion of the ball bearing 45. The ball bearing 46 is mounted to the lower inner peripheral portion of the rotor hub 44 via a ring-shaped bushing 47. A ring-shaped member 56, interposed between the shaft 43 and the ball bearing 45, is a spacer, which forms the ball bearing 45 into a similar form as the lower ball bearing 46.

A stator 52 is mounted substantially to the central portion of the shaft 43. Radially opposed to the stator 52 is disposed a rotor magnet 53 at the inner side of the rotor hub 44 via a rotor yoke 54. At the upper side of the ball bearing 45 (in the figure), that is toward the outer side of the motor, is interposed a ferro-fluid sealing device 49 between the shaft 43 and the rotor hub 44. At the lower side of the ball bearing 46 (in the figure), that is toward the outer side of the motor, is formed an extension section 51 of the lower portion of the bushing 47, which extends toward the shaft 43. The extension section 51 extends out radially inward along the entire circumference of rotation of the bushing 47. A stepped section 50, separated by a small gap in the radial direction so as to oppose the extension section 51, is formed adjacent to the shaft 43. The extension section 51 and the stepped section 50 together form the labyrinth sealing structure. These two sealing means seals the motor.

In the construction of the present spindle motor, the lower side of the rotor hub 44 is not open because it is substantially sealed completely by means of the bushing 47. Therefore, even when the aforementioned sealing means is provided the lubricant still leaks out from the ball bearings 45, 46 and out the motor, since centrifugal force produced by high-speed rotation of the motor are exerted on the lubricant. More specifically, as in the other embodiments, the lubricant leaks along the continuous surface starting from the ball bearings 45, 46 and leading to the surface of the rotor hub 44. In addition to leaking out the component parts of the above-described labyrinth structure, the lubricant also leaks out from the very small gap formed at a junction 65 of the rotor hub 44 and the bushing 47 and out the motor. In the present embodiment, this problem is overcome by providing the following lubricant leakage prevention means.

To eliminate the problem of lubricant leakage from the ball bearing 45, toward the outer side of motor with respect to the ball bearing 45, a lubricant leakage prevention section formed as a substantially arc-shaped cross section, ring-shaped groove 60 is formed in the inner peripheral section 70 of a stepped section 59 of the rotor hub 44 for holding the ball bearing 45. The ring-shaped groove 60 collects the lubricant, when it tries to leak out from the rotor hub 44 side joined to the outer ring of the ball bearing 45 due to centrifugal forces of the rotating rotor hub 44 acting on the lubricant.

At the inner side of the motor, an L-shaped cross section leakage prevention section 58 is formed below the ball bearing 45 in the figure showing the stepped section 59. As in the foregoing embodiments, the leakage prevention section 58 comprises a ring-shaped groove 63 whose opening faces the axial center. The construction is the same as that illustrated in FIG. 3. The leakage prevention section 58 collects the lubricant leaking from the ball bearing 45.

Similarly, as regards lubricant leakage from the other ball bearing 46, a lubricant leakage prevention section or a ring-shaped groove 61 is formed at the inner peripheral portion 71 of the bushing 47. In addition, at the rotor hub 44, an L-shaped cross section leakage prevention section 57 is formed at the rotor hub 44 disposed toward the inner side of the motor, so as to form a ring-shaped groove 64 whose opening faces radially inward. These leakage prevention sections and the grooves are provided for the same reason that the leakage prevention section 58 and grooves 60 provided to prevent ball bearing 45 leakage. An extension section 51, forming a part of the labyrinth sealing structure, extends continuously from the boundary of the ring-shaped groove 61 such that it extends radially inward. Therefore, more effective lubricant leakage prevention, in addition to more effective labyrinth sealing, can be achieved. In this case, the boundary of the ring-shaped groove 61 is formed by the extension section 51 of the labyrinth structure, thus forming a simple structure.

In addition to the above-described leakage prevention means, a ring-shaped sealing member 62 may be interposed between the rotor yoke 54, the rotor magnet 53, and the bushing 53 in order to prevent lubricant leakage from the junction 65. The sealing member 62, pressed against the yoke 54, the rotor magnet 53, and the bushing 53, prevents lubricant leakage from the very small gap at the junction 65. It is preferable that the sealing member 62 be an elastic member made of material such as neoprene rubber, with O ring or the like being used.

Figure 7:
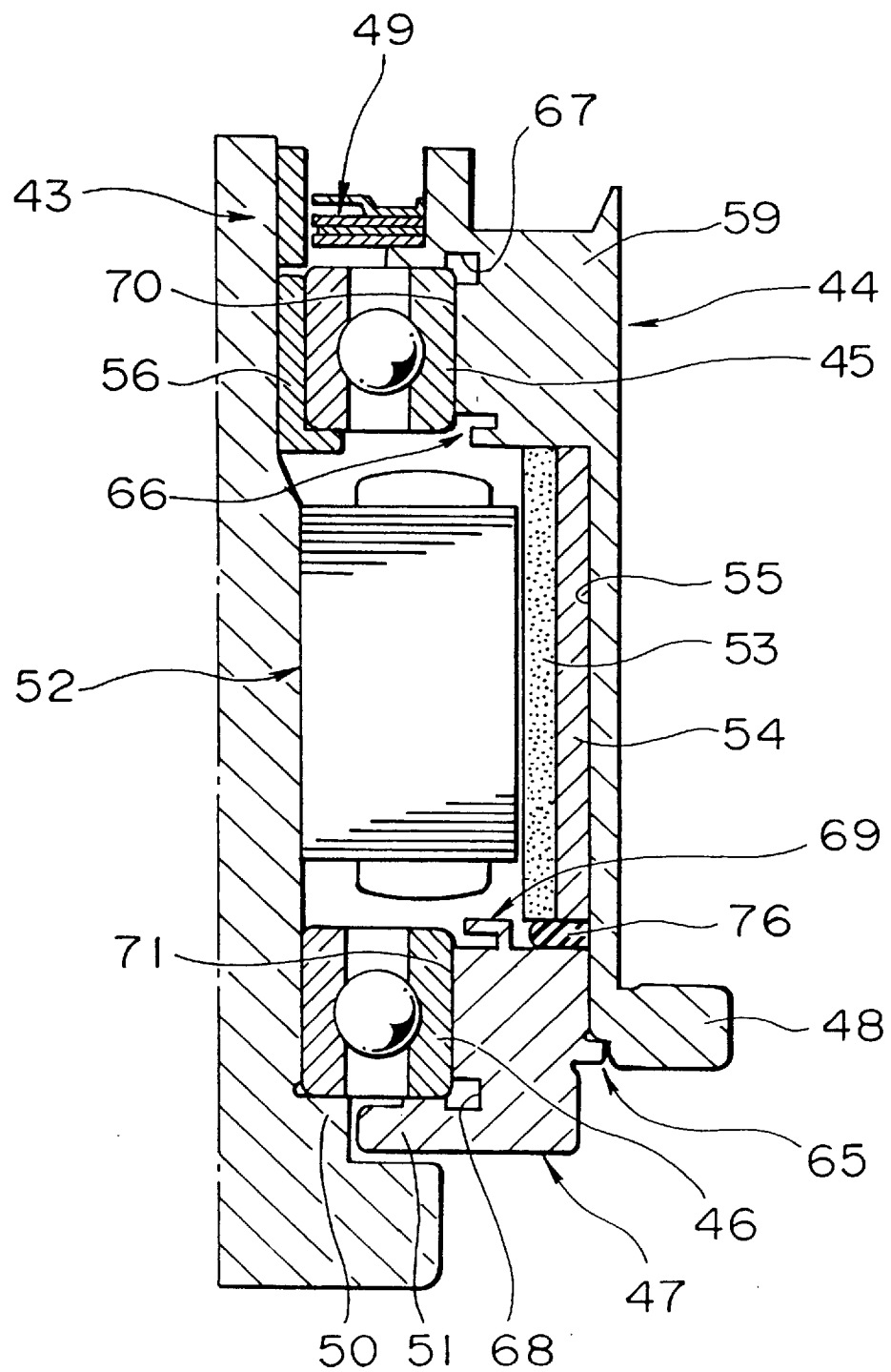
FIG. 7 is a semi-cross sectional view of a spindle motor of a seventh embodiment of the present invention.
Figure 8:
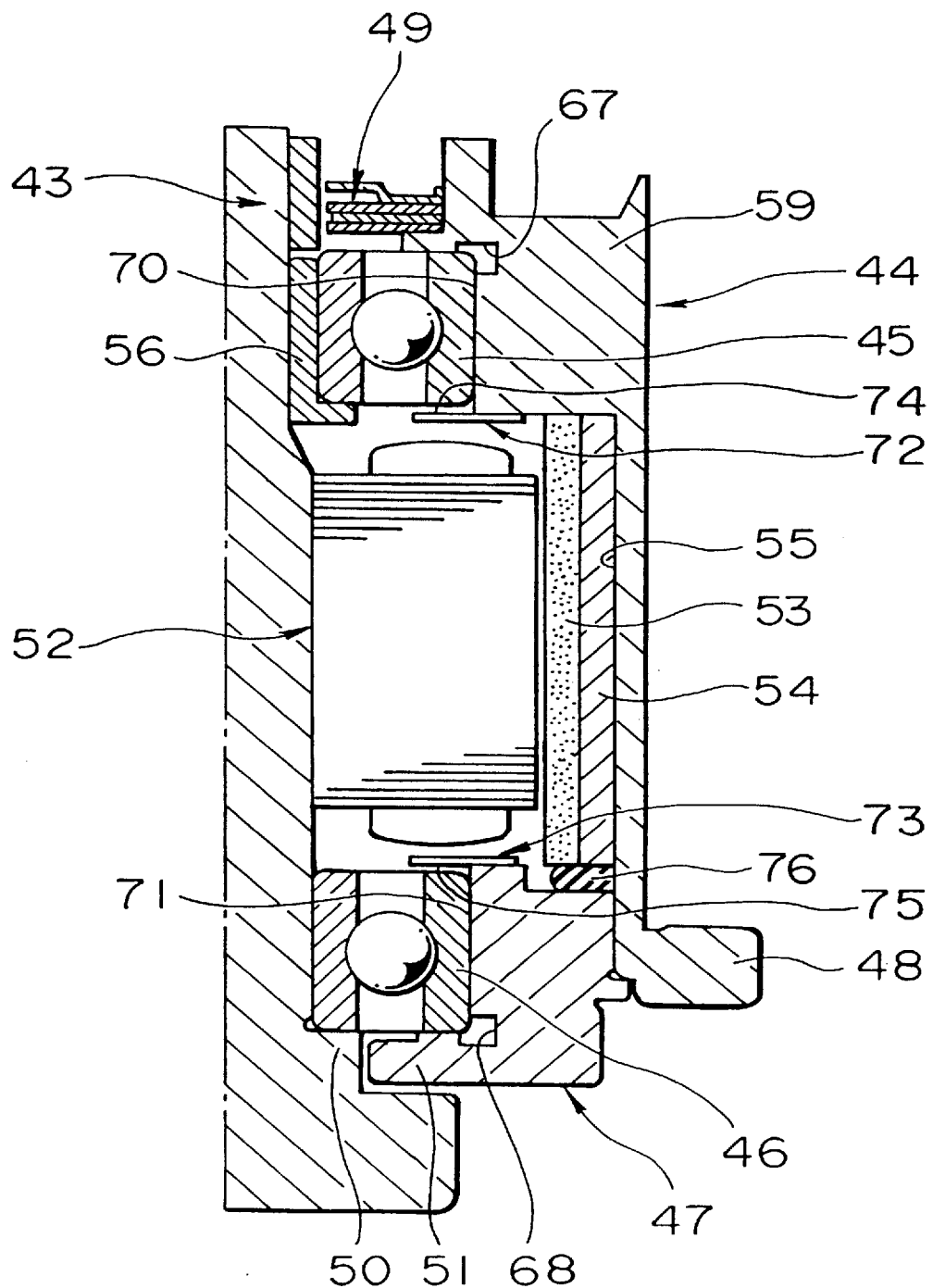
FIG. 8 is a semi-cross sectional view of a spindle motor of an eighth embodiment of the present invention.

Not all of the above-described leakage prevention means need to be provided in the spindle motor at the positions illustrated in the figure. They can be provided, when necessary, in accordance with whether or not they form a good sealing combination with the sealing means and mounting requirements. FIGS. 7 and 8 each illustrate different embodiments of the present embodiment. The spindle motors of these figures have essentially the same construction as the spindle motor of FIG. 6, so that corresponding component parts are given the same reference numerals. The disclosed constructions may be combined in various ways for application.

Seventh Embodiment

Referring to FIG. 7, ring-shaped grooves 67, 68 are provided in place of the ring-shaped grooves 60, 61 of FIG. 6, each of which is rectangular in cross section. In addition, prevention sections 66, 69 are provided in place of the leakage prevention sections 57, 58, each of which is formed integrally with rotor hub 44 and bushing 47, respectively, as shown in the figure. Further, an adhesive 76 is provided in place of the sealing member 62 of FIG. 6, which seals junction 65. A separate adhesive may be used as the adhesive 76 and filled between the predetermined component parts, or the adhesive oozing out from the adhered surfaces upon adhesion of, for example, the rotor yoke 54 or the rotor magnet 53 to the inner periphery of the rotor hub 44 may be used as the adhesive 76.

Eighth Embodiment

In the embodiment illustrated in FIG. 8, prevention sections 72, 73 are provided in place of the prevention sections 66, 69, each of which is formed by plates 74, 75, respectively. The plates 74, 75 are each directly affixed to stepped section 59 and bushing 47, respectively. As described earlier, various plastic materials or the like may be used as a material for the plates.

A description will now be given of the spindle motor of FIG. 9 so constructed as holding a larger amount of lubricant to prevent lubricant leaks.

Ninth Embodiment

Figure 9:
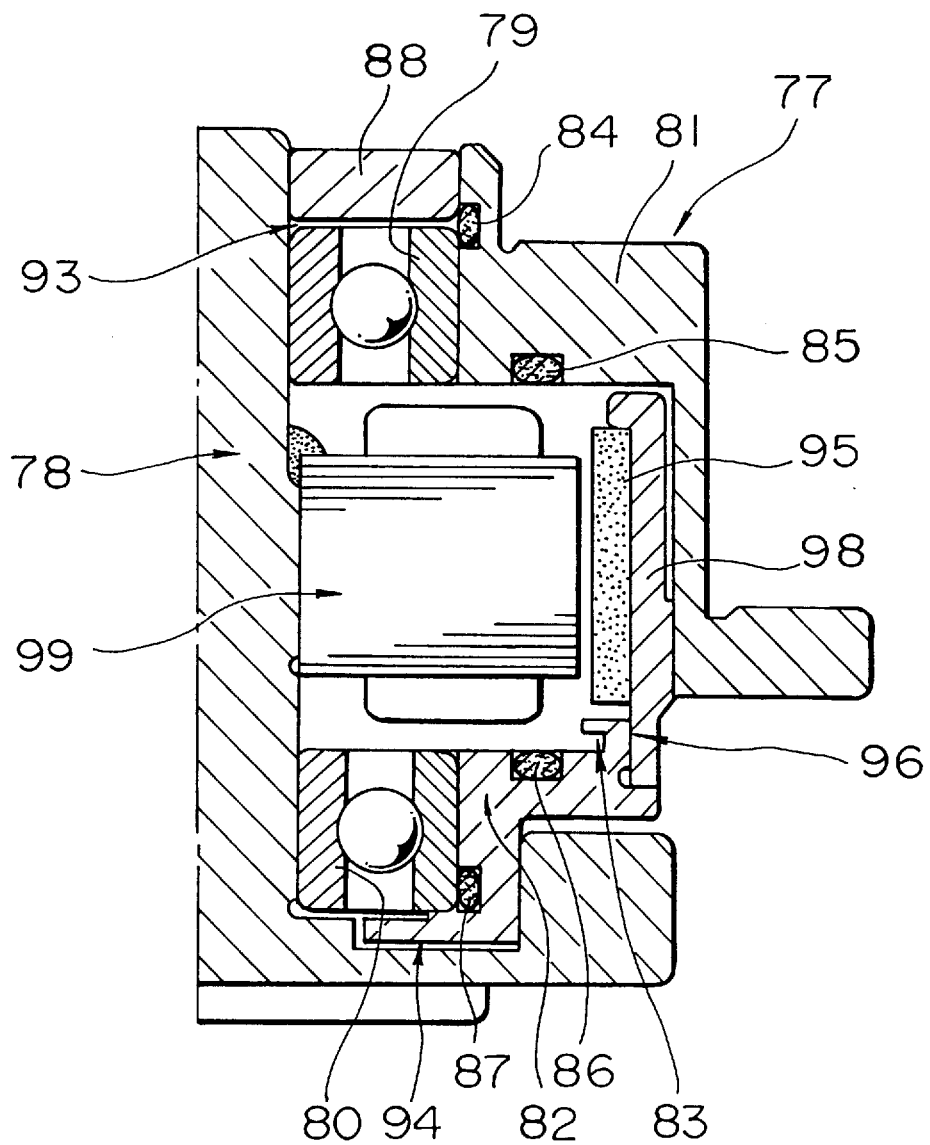
FIG. 9 is a semi-cross sectional view of a spindle motor of a ninth embodiment of the present invention.

FIG. 9 is a cross-sectional view of the right half of a spindle motor of another embodiment of the present invention. Labyrinth structures 93, 94 are provided adjacent to the ball bearings 79, 80, respectively, toward the outer side of the motor. An end of a rotor hub 77 and a bushing 82 are linked firmly together, thereby substantially sealing the motor. In order to prevent the lubricant in the ball bearings 79, 80 to leak out the motor, absorbing members 84, 85, 86, and 87 that absorb and hold the fluid lubricant are provided. The absorbing members 84, 85, 86 and 87 are fitted into the recesses of the rotor hub 77 and the bushing 82. More specifically, they are provided toward the inner and outer sides of the motor with respect to the bearings. Ring-like grooves for preventing fluid lubricant leakage, which have been already used, may be used along with the absorbing members 84, 85, 86 and 87. A ring-like groove 83 is formed in the bushing 82 and at the junction 96 of the bushing 82 and the rotor yoke 93. It can be used in place of the sealing members 62, 76 of FIGS. 6 and 8, respectively.

Figure 10:
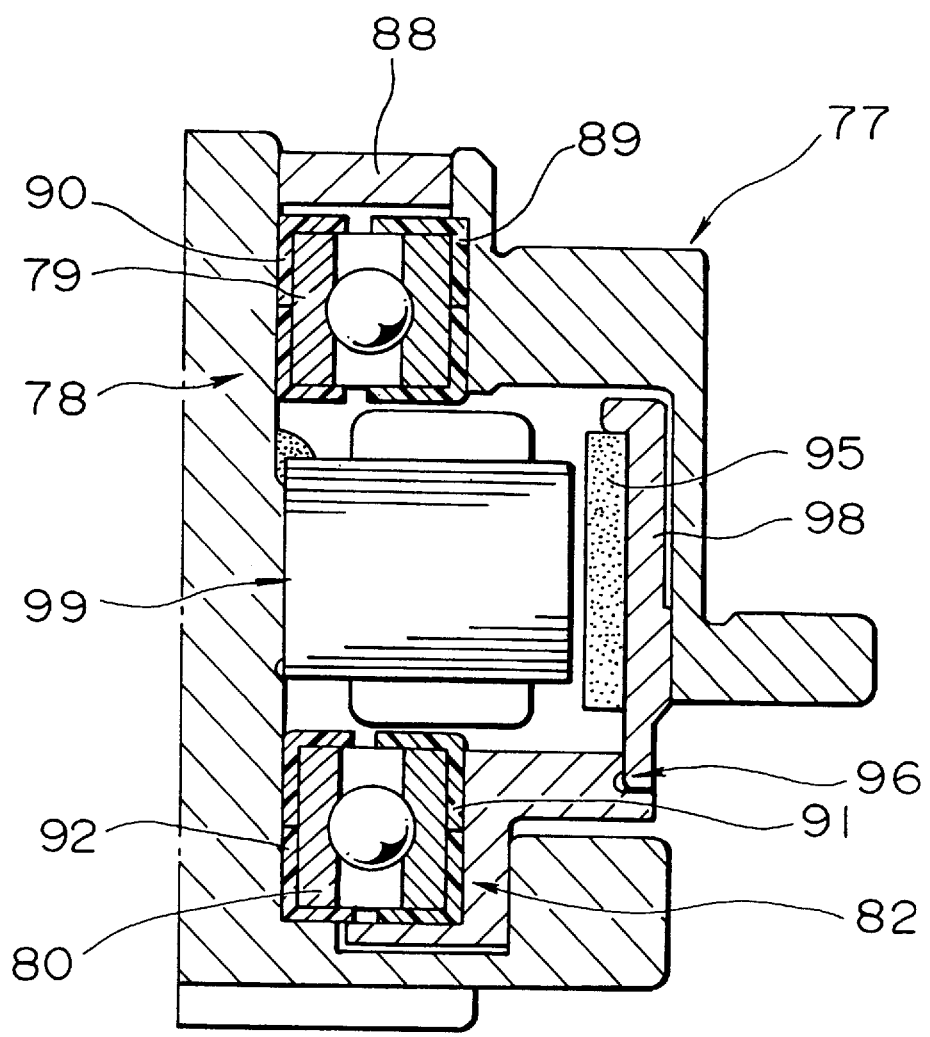
FIG. 10 is a semi-cross sectional view of a spindle motor of a tenth embodiment of the present invention.

In the construction of the embodiment of the spindle motor illustrated in FIG. 10, the bearings in the spindle motor, themselves, are sealed in order to prevent the lubricant from leaking out the bearings.

Tenth Embodiment

The spindle motor of FIG. 10 is a different embodiment and has essentially the same construction as the motor of FIG. 9. In the present embodiment, the lubricant in the bearings are prevented from leaking outside the bearing by covering the ball bearings 79, 80 with cover members. More specifically, the ball bearing 79 is covered by a cover 90 at the inner ring side, and by a cover 89 at the outer ring side. The covers 89, 90 are divided along the axial dimension, thus making it easy to assemble them. The ball bearing 80 is covered by covers 91, 92, which are divided along the axial dimension in the same way. In addition to plastic materials, synthetic resin or the like may also be used to produce the cover. In the present embodiment, a thin film made of polyester, polyimide, or the like and having a thickness of 0.1 mm with a tolerance of about 0.5 um is used because of the necessity of maintaining high rotational precision of the rotor hub 77.

A description will now be given of an essentially different leakage prevention structure that makes it possible to prevent lubricant leakage from the bearing.

Eleventh Embodiment

Figure 11:
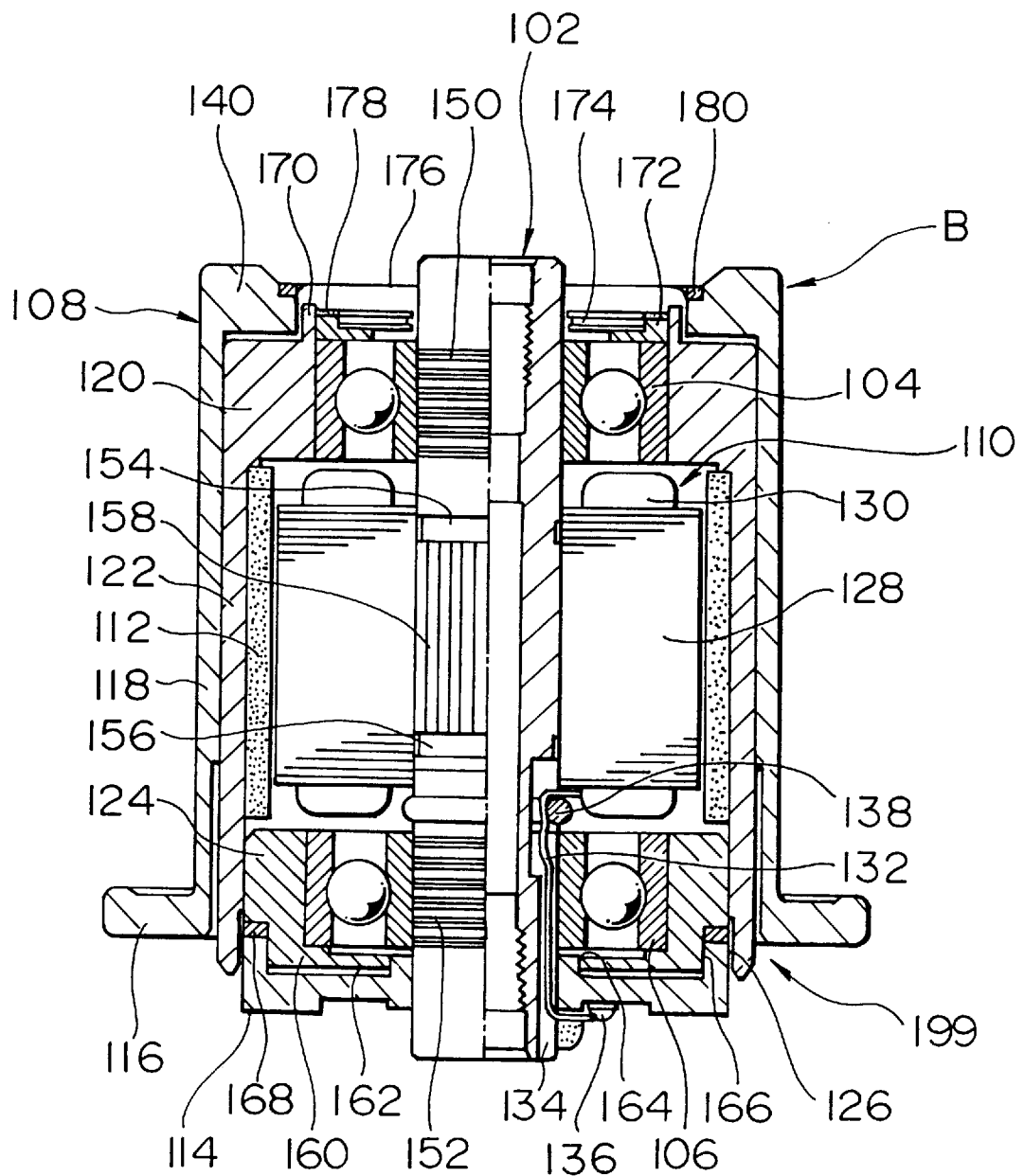
FIG. 11 is a cross sectional view of an entire spindle motor of an eleventh embodiment of the present invention.

As in the spindle motors of FIGS. 6 to 10, the spindle motor of the present embodiment illustrated in FIG. 11 has both ends of the rotor hub substantially sealed. The difference is that at the upper ball bearing 104 side the rotatably supported rotor hub 108 is supported by ball bearing 104 via a rotor yoke 122 rather than being supported directly by the ball bearing 104. In addition to having both ends of the shaft 102 screwed to the drive as in the other embodiments, a disk-shaped flange 114 is mounted to the lower end of the shaft 102 in order to properly position the motor upright.

Before describing the present embodiment, reference will be made of a conventional spindle motor of FIG. 18. This conventional spindle motor has the following construction. More specifically, in order to seal the motor, sealing means are provided at the upper ball bearing 104 and lower ball bearing 106 sides. At the upper ball bearing 104 side, a ferro-fluid sealing device 144 is interposed between a stepped section 140 of the rotor hub 108 and a shaft 102, and at the lower ball bearing 106 side, a labyrinth structure is formed by forming the flange 114 adjacent to the ball bearing 106 along the axial direction. Although such a construction is capable of substantially sealing the spindle motor against leakage, the lubricant in the bearings leak out the motor when the motor rotates at a high speed. More specifically, centrifugal force produced by a motor rotating at a high speed are exerted on the lubricant, causing it to leak out the upper ball bearing 104 through a gap between the inner periphery of the rotor hub 108 and the outer periphery of the rotor yoke 122. Then, it leaks to the junction 199 at the lower portion of the rotor hub 108, and out the motor. The lubricant from the lower ball bearing 106 easily leaks out the motor from the gap 126 of the labyrinth sealing structure.

Figure 18:
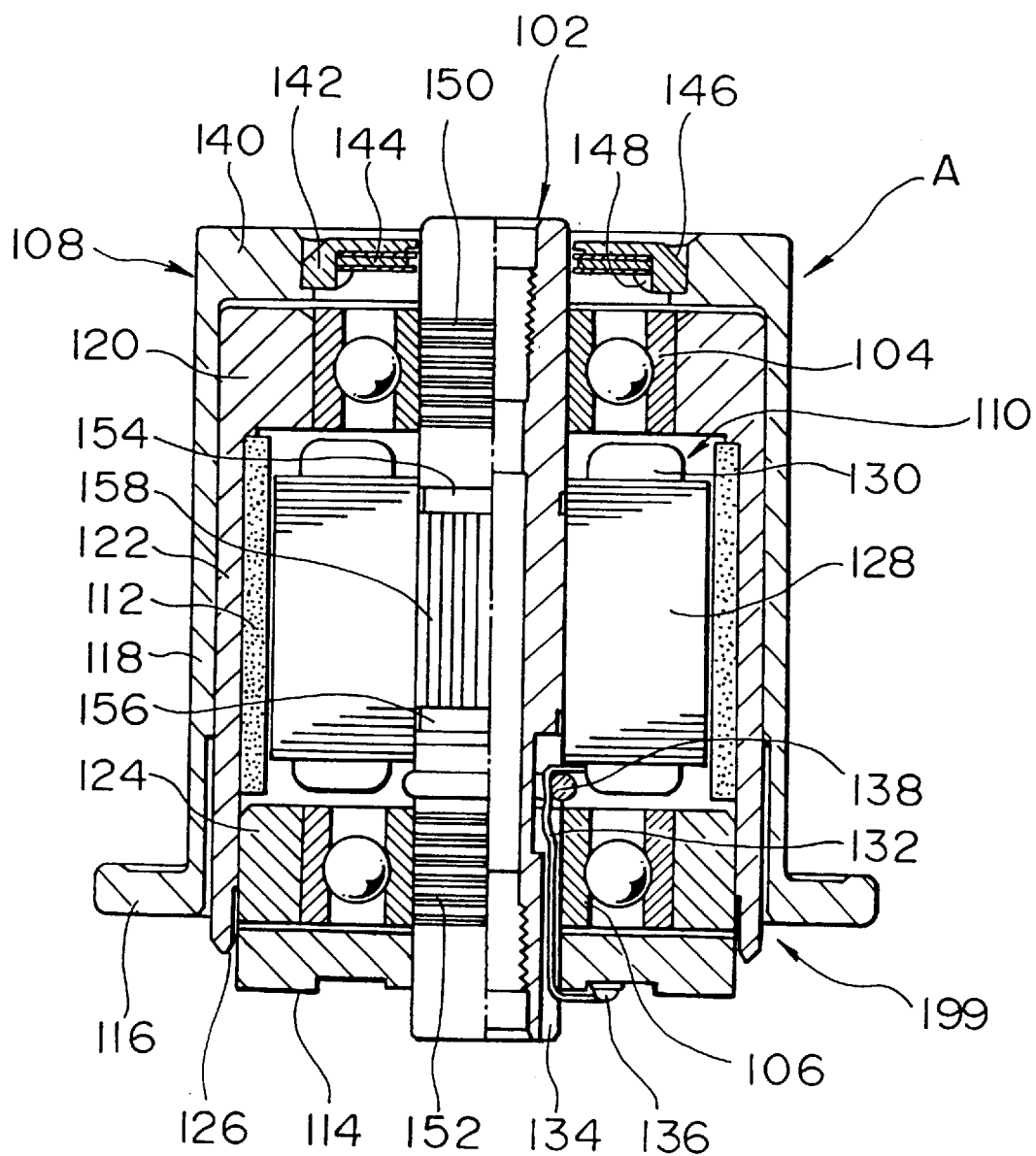
FIG. 18 is an overall cross sectional view of a conventional spindle motor.

Therefore, in the present embodiment illustrated in FIG. 11, to prevent such lubricant leakage the upper ball bearing 104 side is constructed differently from the spindle motor of FIG. 18. More specifically, at the rotor yoke 122 disposed at the inner periphery of the rotor hub 108, a ferro-fluid sealing device 174 is provided adjacent to the ball bearing 104 as viewed in the axial direction above a stepped section 120 of the rotor yoke 122 which holds the outer ring of the upper ball bearing 104. The sealing device 174 seals the portion between the rotor yoke 122 and the shaft 102, which prevents leakage of the lubricant trying to leak toward the upper side and out the motor due to the high rotation of the motor. Therefore, no lubricant will leak into the gap between the rotor hub 108 and the rotor yoke 122 to the junction 199 and out the motor. The junction between the holding member 172 and the rotor yoke 122 is sealed by a sealing agent 78 such as an adhesive. The holding member 172 holds and secures the ferro-fluid sealing device 174.

In the present embodiment, a cap 176 for covering the ferro-fluid sealing device 174 is provided at the stepped section 140 of the rotor hub 108. A small gap is formed between the inner peripheral edge of the cap 176 and the shaft 102 to collect for more lubricant. Accordingly, the ferro-fluid sealing device 174 mounted to the rotor yoke 122 prevents the lubricant from the upper ball bearing 104 to leak out of the rotor yoke 122. In the same way, leakage prevention means to be described below is provided to prevent the lubricant leakage from the ball bearing 104 down the motor interior.

The construction of the lower ball bearing 106 side of the embodiment differs from that of FIG. 18 in the labyrinth structure and the flange 114. An annular, inwardly extending section 160 which covers the lower face of the lower ball bearing 106 is provided at the bushing 124 fixed to the rotor hub 108. A ring-like recess 162 for fitting the extending section 160 therein is formed at the upper surface (toward the inner side of the motor) of the flange 114 fixed to the lower portion of the shaft 102. The ring-shaped groove 162 which faces inward in the motor is defined between the radially inward outer peripheral face and the radially outward inner peripheral face. The extension section 160 of the bushing 124 is defined between the inner peripheral face and the outer peripheral face. A minute gap 164 serving as the labyrinth sealing structure is formed between the aforementioned radially inward outer peripheral face of the recess 162 and the inner peripheral face of the extension section 160. A minute gap 166 is serving as the labyrinth sealing structure is formed between the radially outward inner peripheral face of the recess 162 and the outer peripheral face of the extension 160.

In addition, in FIG. 11, a ring-shaped gap formed radially by the flange 114, the bushing 124, and the rotor yoke 122 is sealed with an absorbing member 168 made of porous material in order to absorb and hold the lubricant.

Accordingly, the inwardly extending section 160 covers the portion between the inner and outer rings of the ball bearing 106 disposed toward the outer side of the motor. Since it has an opening facing the direction in which it is subjected to centrifugal forces, that is radially inward, it collects the lubricant from the ball bearing 106. Any lubricant from the inwardly extending section 160 can be collected by the ring-shaped recess 162 of the flange 114. Any lubricant from the flange 114 can be absorbed by the absorbing member 168. The above-described lubricant paths form the above-described labyrinth structure, each of which together reliably prevent the lubricant from leaking out the motor. Accordingly, since the leakage prevention means are provided along with the labyrinth sealing mechanism, the construction is simple and does not take up space.

In addition to collecting the lubricant leaking out the ball bearing 106, these leakage preventing means are capable of collecting at the same time the lubricant from the ball bearing 104 and leaking along the surface of the motor interior, thereby preventing lubricant leakage out the motor.

In relation to FIG. 11, a description will be given of a different embodiment of the present invention, with reference to FIGS. 12 and 13. In these figures, similar component parts as those of FIGS. 11 are given the same reference numerals.

Figure 12:
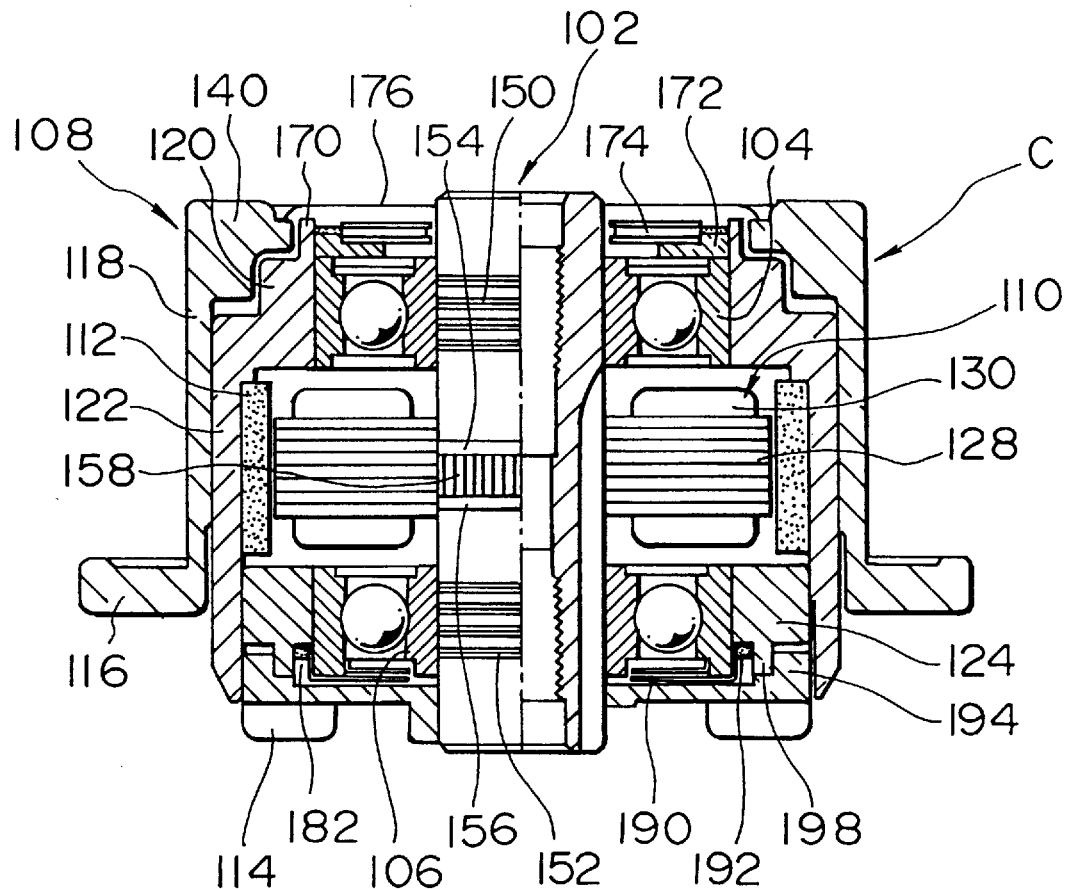
FIG. 12 is a cross sectional view of an entire spindle motor of a twelfth embodiment of the present invention.
Figure 13:
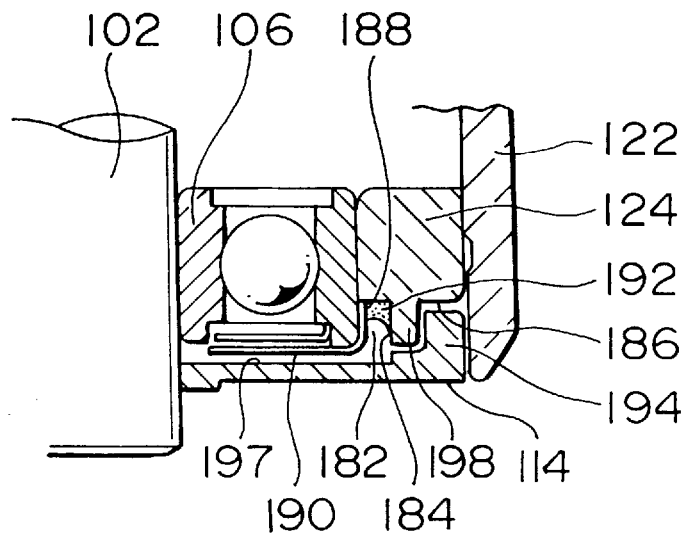
FIG. 13 is a partly enlarged cross sectional view of FIG. 12.

The spindle motor of FIGS. 12 and 13 is essentially constructed in the same way as the spindle motor of FIG. 11. The construction of the present embodiment differs from that of FIG. 11 as follows. A ring-shaped projection 198 is formed projecting out from a bushing 124 which is rotatably supported by ball bearing 106. More specifically, the projection 198 projects downward (in the motor) from the lower end cross sectional central portion of the bushing 124. This forms a gap between the outer peripheral side of the ring-shaped projection 198 and the inner peripheral section of the rotor yoke 122. The projection 194 projecting out the flange 114 is positioned in the gap, resulting in the formation of small gaps between the projection section 194 and the rotor yoke 122, and the projection section 194 and the ring-shaped projection section 198, thereby forming a labyrinth sealing structure.

A cross-sectional L-shaped, ring-shaped cap 190 is secured to the bottom portion of the outer ring of the ball bearing 106. A peripheral wall 188 extending upright with respect to the cap 190 is affixed to the outer peripheral section of the outer ring of the ball bearing 106. The cap 190 is secured to the outer ring with a seal member 192 such as an adhesive which seals a gap formed between the outer ring of the ball bearing 106 and the inner peripheral side of the ring-shaped projection section 198. The cap 190 is positioned such that there is a small gap between the end of the cap extending radially inward and the lower portion of the inner ring of the ball bearing 106, thereby forming a labyrinth sealing structure. These sealing means substantially seal the motor against leakage.

By virtue of the above-described construction of the present embodiment, when the lubricant tries to leak out the ball bearing 106 due to centrifugal forces exerted on the lubricant when the motor rotates at a high speed, it can be collected in the gap between the cap 190 and the ball bearing 106 because the cap 190 is disposed along the lower face of the ball bearing 106 such that its opening extends radially inward. The sealing member 192 prevents lubricant leakage from the gap between the cap 190 and the outer ring of the ball bearing 106 and out the motor. The leaking lubricant can be collected by a recess 197 of the flange 114, and by the labyrinth structures formed by the ring-shaped projection section 198 and the projection section 194, and the projection section 194 and the rotor yoke 122, thus reliably preventing lubricant leakage. These leakage prevention means, themselves, have a simple structure, and are used along with labyrinth sealing structures, thus resulting in a synergistic sealing effect. In addition, the motor can be reduced in size because the structures do not take up much space in the motor.

Figure 14:
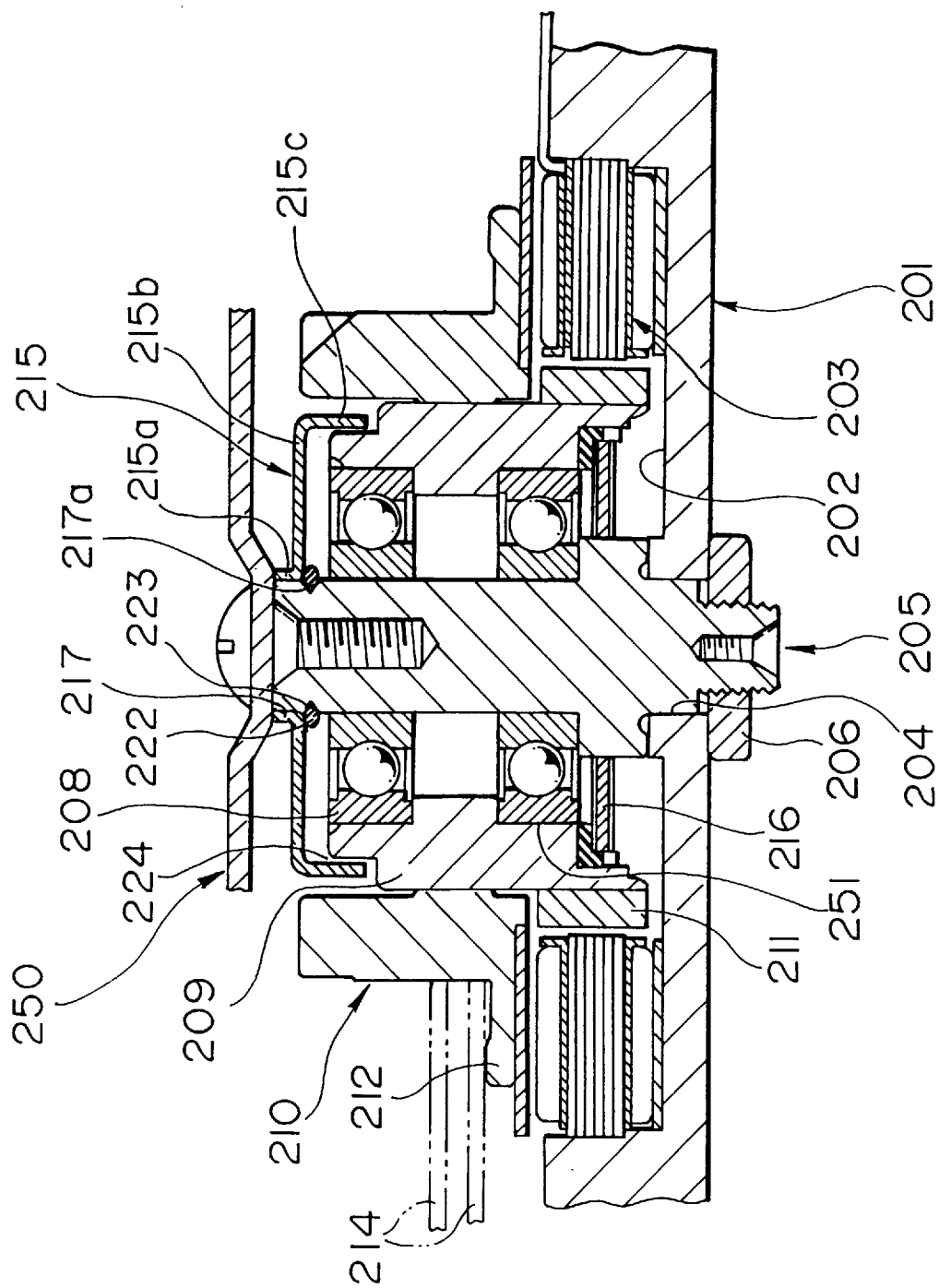
FIG. 14 is a cross sectional view of an entire spindle motor of a thirteenth embodiment of the present invention.

FIG. 14 illustrates a spindle motor construction of another embodiment. A description will be given of the construction for preventing lubricant leakage, with reference to the conventional construction of FIG. 19 which corresponds to the construction of the present embodiment. In FIG. 14, similar component parts are given the same reference numerals.

Thirteenth Embodiment

In the spindle motor of FIG. 14, the lower portion of the shaft 205 is secured to a base member 201 of the drive by a nut 206, and the upper portion of the shaft 205 is screwed to the driving device by means of a cover member 250. A substantially cylindrical sleeve 209 is mounted to the inner periphery of a rotor hub 210 for mounting a disk 214, and is rotatably supported by an upper and lower ball bearing 208, 251 mounted to shaft 205. A ring-shaped rotor magnet 211 is disposed at the lower portion of the sleeve 209 such that the magnet 211 radially opposes a stator winding 203 mounted to the base member 201. Accordingly, the previously described spindle motors are of the so-called outer rotor type in which the stator windings are wound around the rotor magnet, whereas the spindle motor of the present embodiment is of the so-called inner rotor type in which the rotor magnet 211 is surround by the stator winding 203.

In the present embodiment, in order to seal the motor, a ferro-fluid sealing device 216 is provided adjacent to the lower portion of the lower ball bearing 251. A cap 215 is secured to the shaft 205 from the top of the upper ball bearing 208 so as to be adjacent thereto. The outer peripheral section of the cap 215 is bend downwardly or toward the interior of the motor to form a peripheral wall 215c. The peripheral wall 215c and the outer peripheral section of the sleeve 209 form a small gap 224 in the radial direction, thereby forming a labyrinth sealing structure. The labyrinth sealing structure and the ferro-fluid sealing device 216 together substantially seal the motor.

Figure 19:
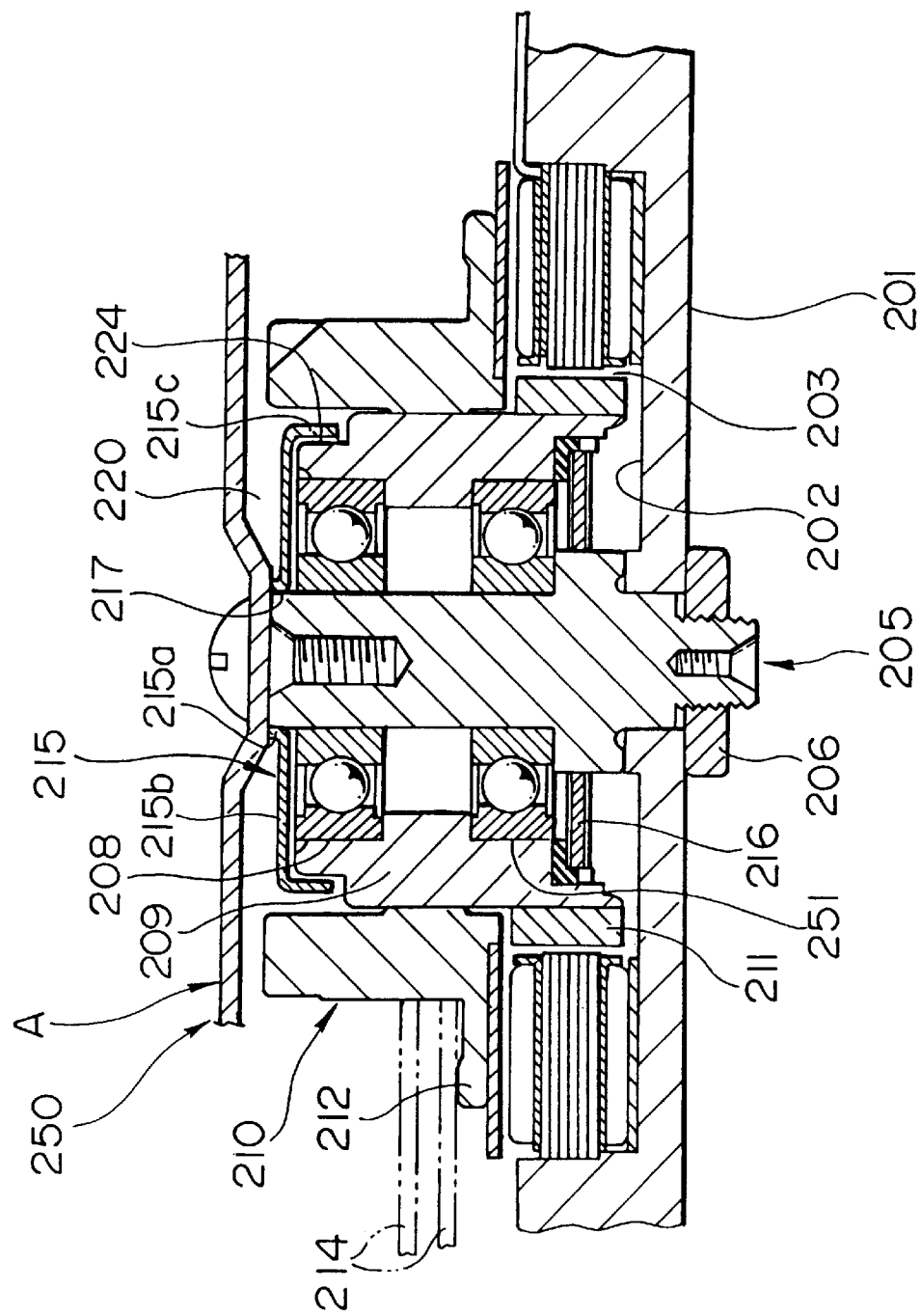
FIG. 19 is an overall cross sectional view of a different conventional spindle motor.

In the conventional spindle motor of FIG. 19, the cap 215 is secured to the shaft 205 by press-fitting. Therefore, when the motor rotates at a high speed, the lubricant of the ball bearing 208 leaks along the surface of the shaft 205 through the small gap 217 between the cap 215 and the shaft 205 and out the motor.

To prevent this sort of lubricant leakage, in the spindle motor of FIG. 14, a ring-shaped sealing member 222 is mounted to the shaft to seal the small gap 217 between the cap 215 and the shaft 205. The sealing member 222 is made of elastic material such as neoprene rubber and is press-contacted and mounted to the shaft 205, thereby sealing the gap 217. A ring-shaped groove 223 is formed in the shaft 205 so that the sealing member 222 can be mounted to the shaft 205 more firmly.

Fourteenth Embodiment

Figure 15:
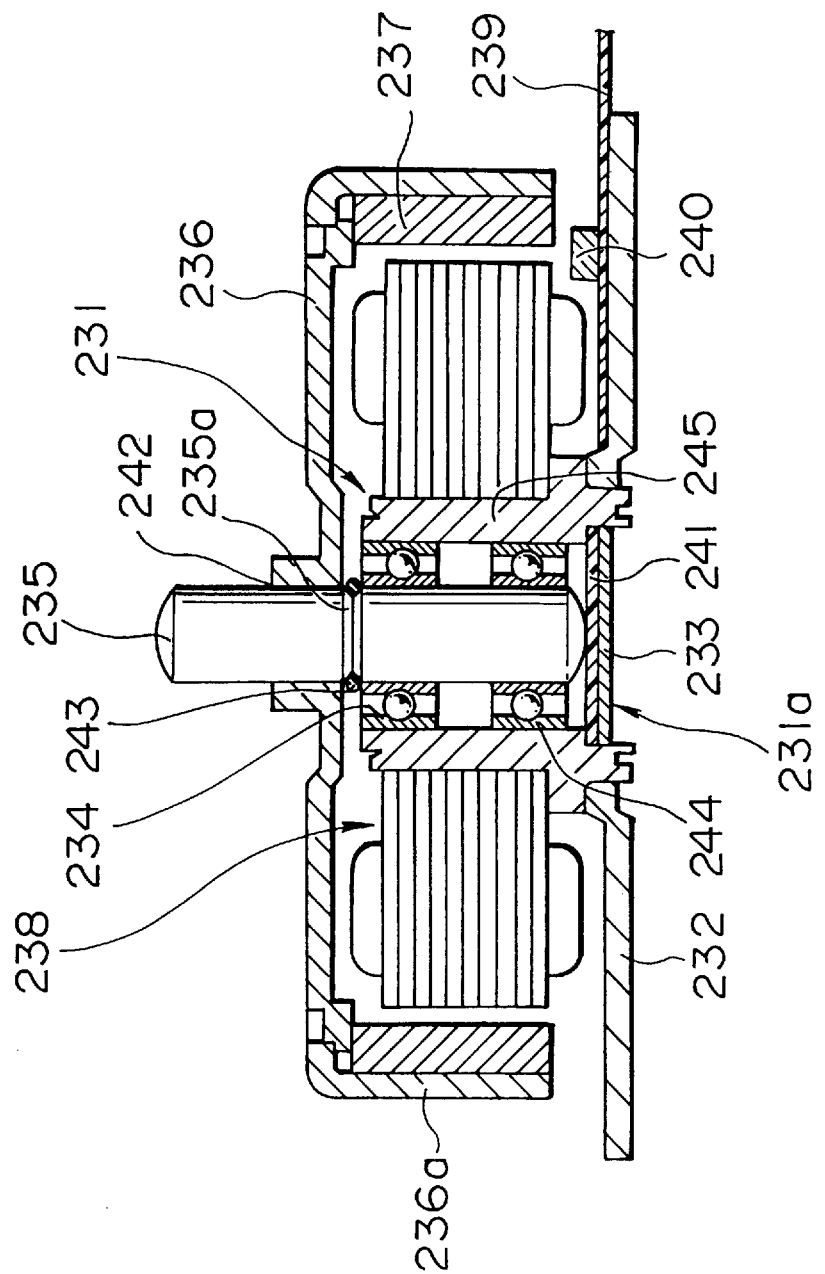
FIG. 15 is a cross sectional view of an entire spindle motor of a fourteenth embodiment of the present invention.

The spindle motor of FIG. 15 is incorporated in a laser beam printer or the like and has a rotating mirror (not shown) at the upper end of a shaft 235. The shaft 235 secured to a rotor hub 236 is rotatably supported by upper and lower ball bearings 234, 244, both of which are mounted to a bearing cylindrical section 245. As in the embodiment of FIG. 14, an O-ring sealing member 243 or the like is mounted to the shaft 235 such that it seals the upper portion of the upper ball bearing 234 and is adjacent to the upper ball bearing 234. A ring-shaped groove 235a is formed in the shaft 235 to press-contact and mount the sealing member 243 to the shaft 235, thereby sealing a gap 242 between the shaft 235 and the rotor hub 236 and thus preventing lubricant leakage from the ball bearing 234 and out the motor. Below the lower ball bearing 244 (toward the outer side of the motor), a thrust plate 231a, also being a sealing member, is mounted to the bearing cylindrical section 245.

Figure 16:
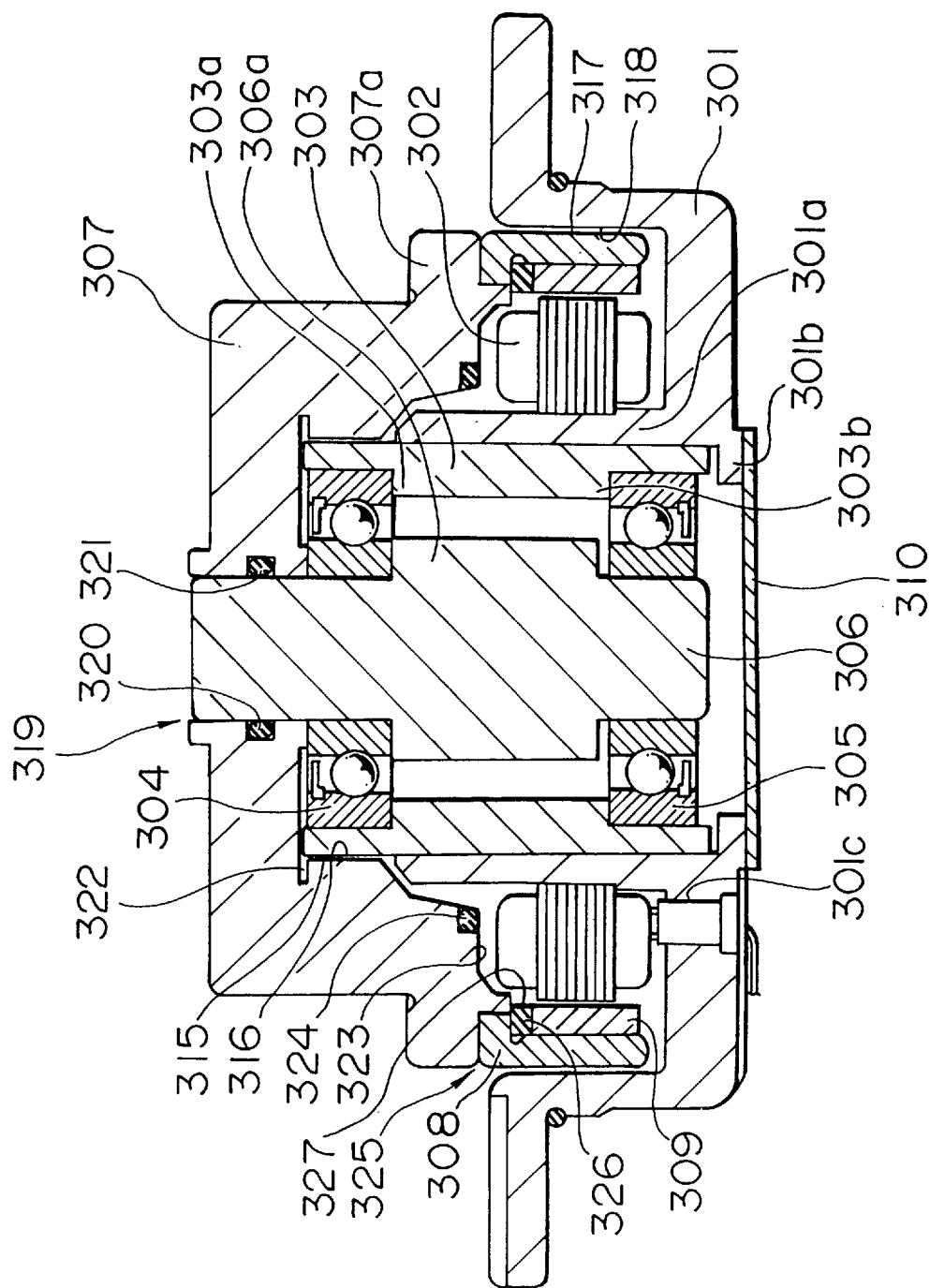
FIG. 16 is a cross sectional view of an entire spindle motor of a fifteenth embodiment of the present invention.

FIG. 16 illustrates a spindle motor of the shaft rotating type of another embodiment of the present invention. Unlike the spindle motor of the shaft rotating type of FIG. 2, the upper and lower sides of the rotor hub are sealed against leakage.

Fifteenth Embodiment

The spindle motor of FIG. 16 has a housing 301 for mounting to the base member of a disk drive, with a bearing cylindrical section 303 formed integrally with the central section of the housing 301. Ball bearings 304, 305 are mounted to the inner portion of the bearing cylindrical section 303 in such a manner as to be spaced apart. At the upper end of a shaft 306 rotatably supported by ball bearings 304, 305, a rotor hub 307 for mounting disks is secured. A rotor yoke 308 is concentrically caulked (plastic deformation) and secured at the lower outer peripheral section of the rotor hub 307, and a rotor magnet 309 is provided at the inner peripheral section of the rotor yoke 308. A stator winding 302 is secured to a bearing cylindrical section 303 so as to oppose the rotor magnet 309.

In the spindle motor of the present embodiment, the inner ring of the upper bearing 304 is nipped in the axial direction between a thick portion 306a of the central portion of the shaft 306 and the rotor hub 307 secured to the upper side of the shaft 306, so that the upper bearing 304 is secured far more firmly to the shaft 306, thus making it possible to increase the natural oscillation frequency of the disk drive incorporating the motor by about 5 to 10% of the conventional frequency. The thick portion 306a of the disk driving device is formed such that it extends down to a point only a small distance from the lower bearing 305, so that the strength of the shaft 306, itself, is increased, thus making it possible to effectively prevent the generation of oscillation.

Figure 17:
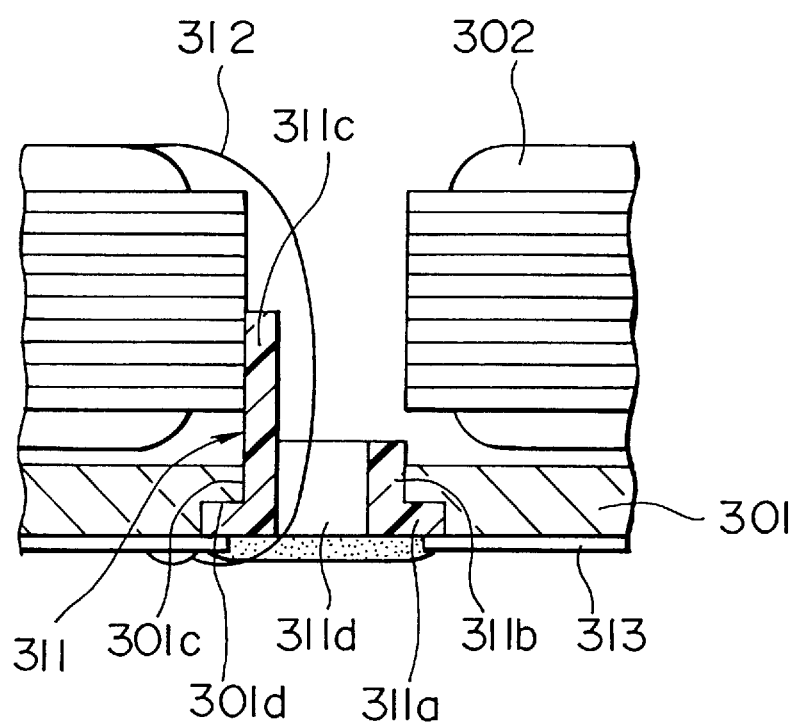
FIG. 17 is a partly enlarged cross sectional view of FIG. 16.

In the present embodiment illustrated in FIG. 17, a terminal bushing 311 formed by insulating resin is placed in a slot of the stator winding 302 and used to position the stator winding 302 with respect to the housing 301. The bushing 311 is inserted from below and into a guide hole 301c. Insertion of the bushing 311 from below the housing 301 allows easier assembly to be realized. The bushing 311 has a flange section 311a which is caught in a recess 301d of the housing 301 to firmly secure the bushing 311 to the housing 301. A projection section 311c extends from a portion of the cylindrical section 311b of the bushing 311, and positions the stator winding 302 in the peripheral direction. A coil wire 312 drawn out from the stator winding 203 is drawn out the motor through a hole 311d of the bushing 311 and soldered onto a flexible circuit substrate 313 mounted to the lower side of the housing 301. The hole 311d of the bushing 311 is sealed with resin.

In such a construction, in order to seal the motor, the upper end of the bearing cylindrical section 303 and the inner wall of the rotor hub 307 as well as the outer peripheral face 315 of the bearing cylindrical section 303 and the inner peripheral wall 316 of the rotor hub 307 are disposed so as to be adjacent to each other. This forms gaps between the upper end of the section 303 and the inner wall of the hub 307 as well as between the face 315 and the wall 316, thereby forming a labyrinth sealing structure. In addition, an outer peripheral face 317 of the rotor yoke 308 and an inner peripheral wall 318 of the housing 301 are disposed so as to be adjacent to each other, thereby forming a labyrinth sealing structure in the same way. At the lower ball bearing 305 side, a cap 310 is affixed to seal the opening of the bearing cylindrical section 303.

In the present embodiment, the following leakage prevention means is utilized to prevent lubricant leakage from the bearings, when the motor rotates at a high speed. Not all of the leakage prevention means to be disclosed need to be used in the motor. They may be utilized depending on the motor dimension and form.

To prevent the lubricant from leaking out the ball bearing 304 through a junction 319 where the shaft 306 is secured to the rotor hub 307 and out the motor, the small gap at the junction 319 is sealed with a ring-shaped member 320. A ring-shaped groove 321 is formed in the hole of the rotor hub 307 to insert the shaft 306, with the ring-shaped member 320 mounted to the ring-shaped groove 321. In addition to the O-ring having elasticity, a sealing member such as an adhesive may be used for the ring-shaped member 320.

Lubricant leakage prevention means is provided in the lubricant path to prevent lubricant leakage, which occurs when the lubricant of the ball bearing 304 leaks along the inner wall 304 of the rotor hub 307 through the rotor yoke 308 and out the motor. A ring-shaped groove 322 with an opening facing radially inward is formed in an inner wall 314 of the rotor hub 307 in order to collect the lubricant leaking out when centrifugal forces act on the lubricant. When necessary, an absorbing member made of porous material may be mounted to the ring-shaped groove 322 in order to absorb and hold the lubricant. It is desirable to employ an absorbing member 324 for absorbing and holding the lubricant at the inner surface of the rotor hub 307, particularly at the inner surface of the hub 307 where it is difficult to form a ring-shaped groove with an opening facing radially inward, such as at the corner of the lower inner wall 323 of the rotor hub 307. To prevent lubricant leakage from a junction 325 of the rotor hub 307 and the rotor yoke 308 and along the outer peripheral face 317 of the rotor yoke 308, an absorbing member 326 is provided in a ring-shaped groove 327 formed by the rotor hub 307, the rotor yoke 308, and the rotor magnet 309. The ring-shaped groove 327 is formed such that its opening faces radially inward. If the junction 325 is previously sealed, the lubricant can be collected without having to use the absorbing member 326. An elastic O-ring, instead of the absorbing member 326, may also be used to seal the ring-shaped groove 327. The elastic O-ring is placed in the ring-shaped groove 327 by press-contacting it thereto.

The present invention is not limited to the spindle motor of the preferred embodiments described above. Although in the foregoing description, a ball bearing was employed as the bearing means, a fluid pressure bearing containing lubricant may also be used as the bearing means. It is apparent to those skilled in the art that various modifications, improvements, combinations, etc. are possible.

What is claimed is:

1. A spindle motor comprising:
   a shaft;
   a cylindrical rotor hub rotatable relative to said shaft;
   a pair of ball bearings filled with a lubricating fluid and interposed between said shaft and said rotor hub for supporting said rotor hub, said rotor hub being provided with at least one annular groove formed on its inner surface and opening toward the interior of said motor for trapping and retaining said lubricating fluid which oozes from said ball bearings and spreads along the inner surface of said rotor hub, thereby preventing said lubricating fluid from leaking to the exterior of said motor;
   a ring-shaped rotor magnet fixedly secured to said rotor hub;
   a stator opposing said rotor magnet; and
   a sealing means disposed axially outwardly of said ball bearings.

2. A spindle motor according to claim 1, wherein an annular member which opens toward said shaft is fixed on the inner surface of said rotor hub so as to form said annular groove in cooperation with the inner surface of said rotor hub.

3. A spindle motor according to claim 1, wherein said annular groove is formed axially outwardly of the outer race of said ball bearings.

4. A spindle motor according to claim 1, wherein an absorbent member is positioned in said groove for absorbing and retaining said leaking fluid.

5. A spindle motor according to claim 4, wherein said absorbent member is made of porous material.

6. A spindle motor comprising:
   a shaft;
   a cylindrical rotor hub rotatable relative to said shaft;
   a pair of ball bearings filled with a lubricating fluid and interposed between said shaft and said rotor hub;
   a ring-shaped rotor magnet fixedly secured to said rotor hub;
   a stator opposing said rotor magnet;
   an annular bushing member interposed between said rotor hub and one of said ball bearings, said rotor hub and said annular bushing member being provided with at least one annular groove on respective inner surfaces of said rotor hub and said annular bushing member for trapping and retaining said lubricating fluid which oozes from said ball bearings and spreads along the inner surface of said rotor hub, thereby preventing said lubricating fluid from leaking to the exterior of said motor;
   a sealing means disposed axially outwardly of said ball bearings; and
   a ring-shaped member disposed on the upper surface of said annular bushing member so as to be in contact with the inner surface of said rotor hub.

7. A spindle motor according to claim 6, wherein a ring member which opens toward said shaft is fixed on the inner surface of said rotor hub so as to form said annular groove in cooperation with the inner surface of said rotor hub.

8. A spindle motor according to claim 6, wherein said annular groove is formed on the inner surfaces of said rotor hub and said annular bushing member axially outwardly of the outer races of said upper and lower ball bearings.

9. A spindle motor according to claim 8, wherein said annular groove is formed to surround the axially and radially outer edges of respective outer races of said ball bearings.

10. A spindle motor according to claim 6, wherein an absorbent member is positioned in said groove for absorbing and retaining said leaking fluid.

11. A spindle motor according to claim 10, wherein said absorbent member is made of porous material.

12. A spindle motor according to claim 6, wherein said ring-shaped member is made of porous material such that said ring-shaped member absorbs and retains said lubricating fluid which oozes from said ball bearings and diffuses along the inner surface of said rotor hub so as to prevent said lubricating fluid from leaking to the exterior of said motor.

13. A spindle motor according to claim 6, wherein said stator is disposed between said ball bearings such that said stator is surrounded by said ball bearings, said rotor hub and said bushing, and lubricating fluid leakage preventing means is provided respectively on said rotor hub and said bushing and axially faces said stator.

14. A spindle motor according to claim 13, wherein said lubricating fluid leakage preventing means includes a plurality of ring-shaped projections respectively formed integrally with said rotor hub and said bushing.

15. A spindle motor according to claim 13, wherein said lubricating fluid leakage preventing means includes a plurality of ring-shaped plate members secured to said rotor hub and said bushing over the inner surface of the outer races of said bearings.

16. A spindle motor according to claim 13, wherein said lubricating fluid leakage preventing means includes a plurality of grooves formed on the surface of said rotor hub and axially faces said stator.

17. A spindle motor comprising:
a shaft;
a cylindrical rotor hub rotatable relative to said shaft;
a pair of ball bearings filled with a lubricating fluid and interposed between said shaft and said rotor hub, said rotor hub being provided with at least one annular groove on the inner surface of said rotor hub for trapping and retaining said lubricating fluid which oozes from said ball bearings and spreads along the inner surface of said rotor hub; thereby preventing said lubricating fluid from leaking to the exterior of said motor;
a ring-shaped rotor magnet fixedly secured to said rotor hub;
a stator opposing said rotor magnet;
an annular bushing member interposed between said rotor hub and one of said ball bearings;
a sealing means disposed axially outwardly of said ball bearings; and
a ring-shaped member disposed on the upper surface of said annular bushing member so as to be in contact with the inner surface of said rotor hub.

18. A spindle motor according to claim 17, wherein a ring member which opens toward said shaft is fixed on the inner surface of said rotor hub so as to form said annular groove in cooperation with the inner surface of said rotor hub.

19. A spindle motor according to claim 17, wherein said annular groove is formed on the inner surface of said rotor hub axially outwardly of the outer race of one of said ball bearings.

20. A spindle motor according to claim 17, wherein annular groove is formed to surround the axially and radially outer edge of the outer race of one of said ball bearings.

21. A spindle motor according to claim 17, wherein an absorbent member is positioned in said groove for absorbing and retaining said leaking fluid.

22. A spindle motor according to claim 21, wherein said absorbent member is made of porous material.

23. A spindle motor according to claim 17, wherein said ring-shaped member is made of porous material such that it absorbs and retains said lubricating fluid which oozes from said ball bearings and diffuses along the inner surface of said rotor hub so as to prevent said lubricating fluid from leaking to the exterior of said motor.

24. A spindle motor according to claim 17, wherein said stator is disposed between said ball bearings such that said stator is surrounded by said ball bearings, said rotor hub and said bushing, and lubricating fluid leakage preventing means is provided respectively on said rotor hub and said bushing and axially faces said stator.

25. A spindle motor according to claim 24, wherein said lubricating fluid leakage preventing means includes a plurality of ring-shaped projections respectively formed integrally with said rotor hub and said bushing.

26. A spindle motor according to claim 24, wherein said lubricating fluid leakage preventing means includes a plurality of ring-shaped plate members secured to said rotor hub and said bushing over the inner surface of the outer races of said ball bearings.

27. A spindle motor according to claim 24, wherein said lubricating fluid leakage preventing means includes a plurality of grooves formed on the surface of said rotor hub and said bushing axially facing said stator.

28. A spindle motor comprising:
a shaft;
a cylindrical rotor hub rotatable relative to said shaft;
a pair of ball bearings filled with a lubricating fluid and interposed between said shaft and said rotor hub;
a ring-shaped rotor magnet fixedly secured to said rotor hub;
a stator opposing said rotor magnet;
an annular bushing member interposed between said rotor hub and one of said ball bearings, said bushing being provided with at least one annular groove on the inner surface of said bushing for trapping and retaining said lubricating fluid which oozes from said ball bearings and spreads along the inner surface of said rotor hub, thereby preventing said lubricating fluid from leaking out to the exterior of said motor;
a sealing means disposed axially outwardly of said ball bearings; and
a ring-shaped member disposed on the upper surface of said annular bushing member so as to be in contact with the inner surface of said rotor hub.

29. A spindle motor according to claim 28, wherein a ring member which opens toward said shaft is fixed on the inner surface of said rotor hub so as to form said annular groove in cooperation with the inner surface of said rotor hub.

30. A spindle motor according to claim 28, wherein said annular groove is formed on the inner surface of said annular bushing member axially outwardly of the outer race of one of said ball bearings.

31. A spindle motor according to claim 30, wherein said annular groove is formed to surround the axially and radially outer edge of the outer race of one of said ball bearings.

32. A spindle motor according to claim 28, wherein an absorbent member is positioned in said groove for absorbing and retaining said leaking fluid.

33. A spindle motor according to claim 32, wherein said absorbent member is made of porous material.

34. A spindle motor according to claim 28, wherein said ring-shaped member is made of porous material such that it absorbs and retains said lubricating fluid which oozes from said ball bearings and diffuses along the inner surface of said rotor hub so as to prevent said lubricating fluid from leaking to the exterior of said motor.

35. A spindle motor according to claim 28, wherein said stator is disposed between said ball bearings such that said stator is surrounded by said ball bearings, said rotor hub and said bushing, and lubricating fluid leakage preventing means is provided respectively on said rotor hub and said bushing on the surface axially facing said stator.

36. A spindle motor according to claim 35, wherein said lubricating fluid leakage preventing means includes a plurality of ring-shaped projections respectively formed integrally with said rotor hub and said bushing.

37. A spindle motor according to claim 35, wherein said lubricating fluid leakage preventing means includes a plurality of ring-shaped plate members secured to said rotor hub and said bushing over the inner surface of the outer races of said bearings.

38. A spindle motor according to claim 35, wherein said lubricating fluid leakage preventing means includes a plurality of grooves formed on the surface of said rotor hub and said bushing axially facing said stator.

* * * * *